United States Patent

[11] 3,610,737

[72] Inventors Max Bender;
 Anthony J. LaRocca, both of Ann Arbor, Mich.
[21] Appl. No. 49,405
[22] Filed June 24, 1970
[45] Patented Oct. 5, 1971
[73] Assignee The United States of America as represented by the Secretary of the Air Force

[54] PRECISION RADIATION ATTENUATOR
 1 Claim, 3 Drawing Figs.
[52] U.S. Cl. ............................................... 350/294,
 250/83.3 H, 250/236, 350/7, 350/289, 356/43, 356/216
[51] Int. Cl. ..................................................... G02b 5/10
[50] Field of Search .......................................... 350/1, 7,
 289, 293, 294; 250/83.3 H, 236, 217 R; 356/216, 43; 331/94.5

[56] References Cited
UNITED STATES PATENTS
3,083,612  4/1963  Miller ............................ 350/293 X
3,313,154  4/1967  Bruce ............................ 331/94.5 UX
3,508,056  4/1970  Fricke ............................ 250/83.3 H Primary Examiner—David Schonberg
Assistant Examiner—John W. Leonard
Attorneys—Harry A. Herbert, Jr. and Ruth G. Codier ABSTRACT: Attenuation of electromagnetic radiation from the ultraviolet through the infrared region of the electromagnetic spectrum is achieved in an extremely precise manner through the use of a pair of reflecting spheres of precise roundness, arranged so that radiation polarization effects are small. One of the spheres is rotated to further reduce stray radiation, and has a portion which is blackened to further reduce the radiation.

PATENTED OCT 5 1971 3,610,737

INVENTORS
MAX BENDER,
BY ANTHONY J. LaROCCA
Harry A. Herbert Jr
Ruth Codier
ATTORNEYS 3,610,737

PRECISION RADIATION ATTENUATOR

BACKGROUND OF THE INVENTION

The invention relates to a precision radiation attenuator, and more particularly to a device for receiving radiation, spreading it out, preventing it from polarizing, and getting measurable attenuation of the initial radiation.

The need for new and more precise methods of controlling and dispersing or attenuating radiation from all kinds of sources is well known. Most of the old methods require large unwieldy configurations, giving rise to errors in the reduced exiting radiation.

Some of the old methods use the principle of reflection from spherical surfaces, generally convex mirrors, or the convex surface of a lens which has been metal-coated. Still others use the principle of diffusion and attenuation by filtering.

These methods and others now available, do not achieve the control of polarization effects, stray radiation effects and sufficient precision in the spherical surfaces used, and most of them require complicated and cumbersome designs. This gives rise, as above stated, to increased excitation, which is the opposite of the result which is desired.

Actually, no convenient standard of spectral flux existed until the recent establishment of a standard of spectral radiance in the form of a tungsten strip lamp by direct comparisons with the radiances of blackbodies. This standard, however, yields irradiances for reasonable aperture sizes and distances that are many times too high for certain calibration work requiring photomultipliers, scintillators, or other high sensitivity detectors for measuring low irradiances such as those from the air-glow, or from weak phosphorescent, fluorescent, or biochemical sources. Although miniature diaphragms might be employed, the interference-fringe effects resulting therefrom, together with the necessity of working at great distances from this standard, rule out its use in this area without the use of auxiliary optics.

SUMMARY OF THE INVENTION

The object of the invention is the provision of a device and method for precision attenuation of electromagnetic radiation from ultraviolet through the infrared region of the electromagnetic spectrum. The method has an extremely high degree of accuracy and a capacity for attenuation to a very low level irradiance (of the order of $10^{1/2}$ watts).

The device has potential as an instrument for standards of extremely low irradiance, and has potential also as a laser power meter.

These effects are achieved through the use of reflecting spheres of precise curvature so arranged that polarization effects are very small. These spheres are rotated at precisely designed speeds, each reducing polarization and stray radiation effects.

In summary, the features believed to be new are as follows:
1. Use of precision ground reflecting spherical bodies.
2. Precision interchangeability of spheres and flat reflecting surfaces.
3. Reduction of polarization effects with a small easily handled configuration for laboratory use.
4. Reduction of internal stray radiation effects by effecting rotation of one of the reflecting spherical bodies, and providing a black absorbing surface on the rotating sphere.

These and other advantages, features and objects of the invention will become more apparent from the following description taken in connection with the illustrative embodiment in the accompanying drawing.

DESCRIPTION OF A PREFERRED EMBODIMENT

Figure 1:
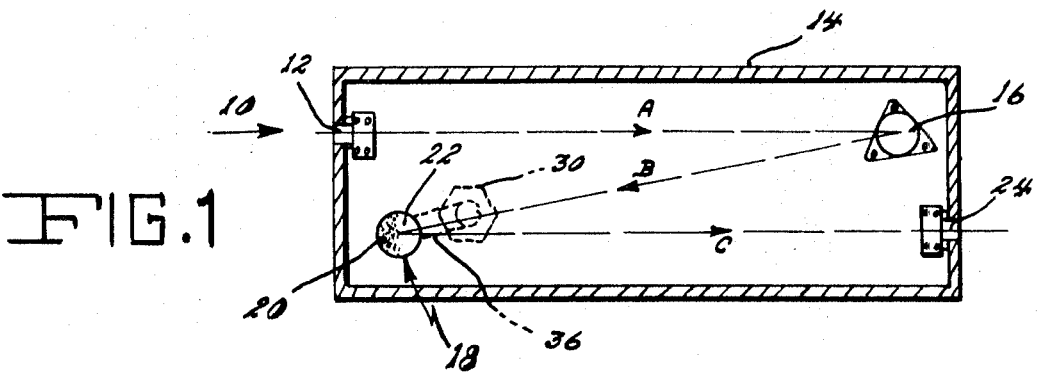
FIG. 1 is a top plan view of the precision radiation attenuator according to the invention.
Figure 2:
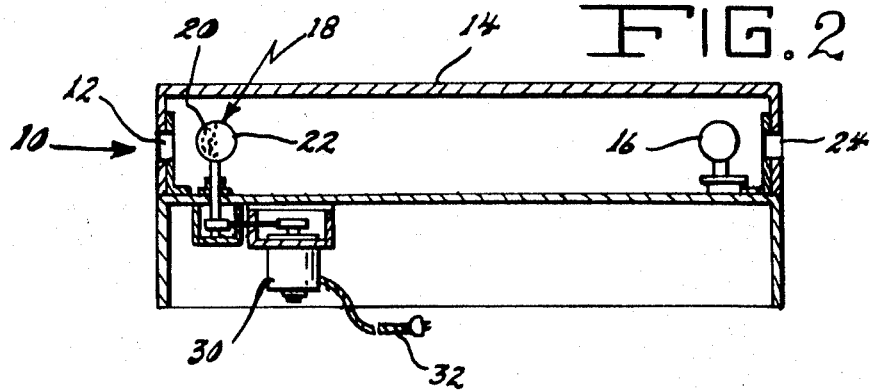
FIG. 2 is a vertical longitudinal cross-sectional view.
Figure 3:
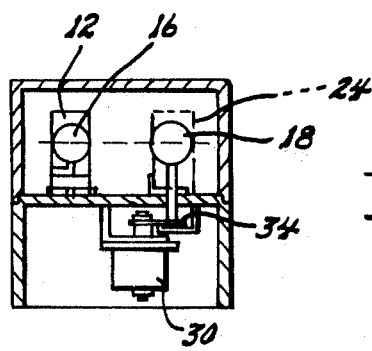
FIG. 3 is an end view of the device.

The radiant flux indicated at 10 in FIG. 1 enters an aperture 12 in an enclosure 14. The aperture 12 becomes in effect a source of radiation which impinges on a first sphere 16. This sphere 16 is interchangeable with elements of existing devices, such as flat metallic reflectors. The radiation A entering the opening 12 and striking the sphere 16, is spread out, some of it striking a second sphere 18. The sphere 18 is mounted for rotation, and has a reflecting portion 20 and a nonreflecting blackened radiation absorbing portion 22.

The radiation B which reaches the sphere 18 from the sphere 16 is further dispersed and partially absorbed, a portion of it indicated at C finally reaching the exit aperture 24 and emerging as greatly reduced radiation of known quantity.

Means, such as a motor 30, plug 32 and standard gear train 34, and/or pulley 36 are provided for the rotation of the sphere 18. These are standard elements to which the invention is not limited, and which form no part of it.

The degree of attenuation is known from quantitative relationship between the radii of curvature of the spheres, the spectral reflectance of their surfaces, and the distances and angles between them. The rotation of the second sphere 18 allows the use of synchronous detection techniques and thus eliminates stray radiation from the walls of the enclosure that may occur from the first sphere 16. Flat mirrors may be interchanged with the spheres 16 and 18 in combination or alone to give four combinations of attenuation. Angles of incidence and reflection of radiation with the spheres have been selected to minimize polarization effects. The accuracy of the spherical surfaces is accurately known to be of the order of 1 part in 10,000. Reflectance and distances can be known accurately to 1 part in 1,000, depending on the metal surfaces used.

Precision has been improved by the use of precision ground spheres, low angles of incidence and reflection, and by dropping the radiation internally in the enclosure.

An alternate method of construction would be to add successive reflecting surfaces, either spherical or flat, to attain more or less attenuation over a wider range of intensities. Particular surfaces of reflection could control spectral content of exiting radiation as well.

The device is useful for calibration of lasers and for laser power meters. It will be understood, however, that its application extends to other radiometric instrumentation where attenuation of radiation is desirable.

Although the invention has been described with reference to a particular embodiment it will be understood to those skilled in the art that the invention is capable of a variety of alternative embodiments within the spirit and scope of the appended claims.

We claim:

1. In a precision radiation attenuator, an enclosure, a first spherical body located in said enclosure having a precision ground reflecting surface for receiving and dispersing radiation received through an aperture provided therefor in a wall of said enclosure, a second spherical body located in said enclosure, said second spherical body being mounted for rotation, one portion of said second spherical body being a precision ground reflecting surface for reflecting, dispersing and attenuating radiation received from said first spherical body, another portion of said second spherical body being a black surface for receiving and absorbing radiation received from said first spherical body, an exit aperture in a wall of said enclosure for exiting radiation received and reflected from said second spherical body, reflectances of the reflecting spherical bodies and distances between them and also the angles of incidence being known and measurable quantities.

UNITED STATES PATENT OFFICE
CERTIFICATE OF CORRECTION

Patent No. 3,610,737         Dated 5 October 1971

Inventor(s) Max Bender and Anthony J. La Rocca

It is certified that error appears in the above-identified patent and that said Letters Patent are hereby corrected as shown below:

Column 1, line 46, matter in parentheses should read --(of the order of $10^{-12}$ watts)--.

Signed and sealed this 18th day of July 1972.

(SEAL)
Attest:

EDWARD M. FLETCHER, JR.
Attesting Officer

ROBERT GOTTSCHALK
Commissioner of Patents